April 20, 1965   W. W. WARD   3,179,320
FOOD TRAY
Filed Oct. 2, 1963
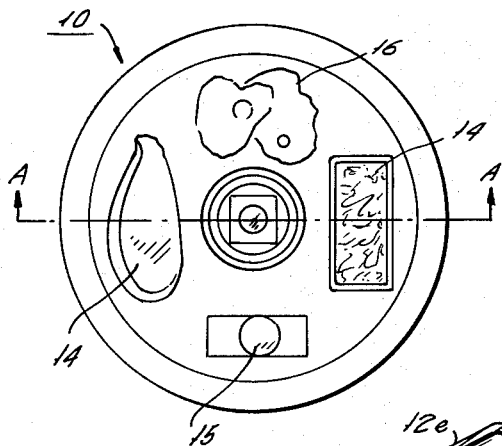
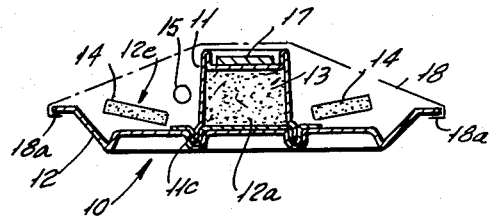
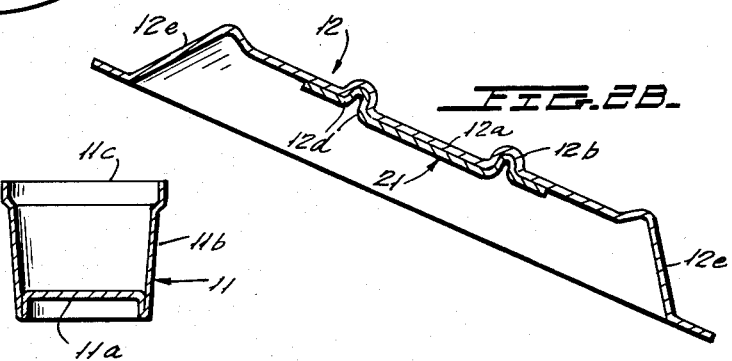
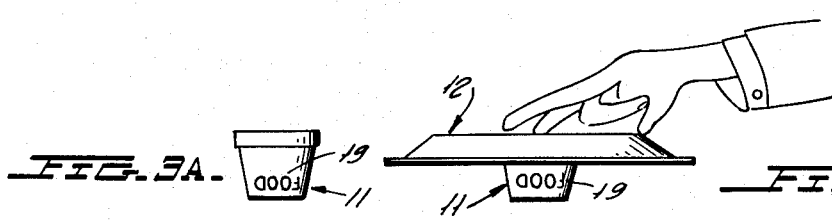
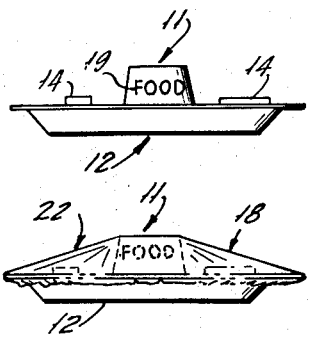
INVENTOR.
WALLACE W. WARD
BY
OSTROLENK, FABER, GERB & SOFFEN
ATTORNEYS

3,179,320
FOOD TRAY
Wallace W. Ward, 28 Longhill Lane, Chatham, N.J.
Filed Oct. 2, 1963, Ser. No. 313,374
5 Claims. (Cl. 229—1.5)

This application relates to food containers and more particularly to a novel food container structure for use in food carry-out operations which is so designed as to provide superior insulation and transportation functions, while at the same time providing the function of acting as the serving or eating platter at the location where the food is to be consumed.

Due to its extreme popularity, the take-out business of the food and restaurant industry has grown to extremely large proportions. Together with this, containers for takeout orders have also grown very rapidly. Containers presently employed in take-out operations take upon a variety of different forms. In cases where hot food aggregates are provided typical containers employed are the cylindrical tapered containers which are utilized for items, such as, coffee, soups, and other hot foods, such as, spaghetti, chow mein, chop suey, ravioli, chili concarne, and the like. Another typical takeout container is the box-like container made of a fairly stiff papier-mâché material which is provided with a small handle to facilitate the carry-out and transportation of the container. In instances where it is desirable to provide additional condiments which are to be transported together with the food aggregate, no known packages presently provide a separate container or compartment for the carry-out of such accompanying condiments, such as, for example, crackers, bread, garlic bread, olives, celery, Parmesan cheese and the like. In such instances, such as, for example, with the packaging of spaghetti, it is undesirable to place the bread order and other condiments on the surface of the spaghetti due to the contamination of the condiments by the spaghetti. This necessitates a separate bag or package for carrying the associated condiments.

The instant invention provides a container assembly which during the transportation operation provides a substantially low surface area high volume density for transporting the hot food aggregate, as well as providing isolated space for carrying the associated condiments, which container assembly further functions as the serving or eating place for the hot food (or cold food) order transported.

The instant invention is comprised of a first member which is a container in the form of a substantially cylindrical tapered cup having dimensions similar to the large carry-out coffee cups presently in use. The second member of the assembly is comprised of a papier-mâché plate of the picnic plate type, which plate is preferably of a 9" or 10" diameter. The central portion of the plate base is provided with a preformed circular shaped groove, the diameter of which is substantially identical to the diameter of the cup container lip. Thus the paper plate is utilized as the sealing lid for the container employed to carry the hot (or cold) food aggregate.

The usage of the container apparatus is as follows.

The hot food aggregate is placed in the container and the paper plate is positioned upon the open end of the cup container such that the container lip is inserted within the circular groove provided in the base of the papier-mâché plate. A good frictional engagement is provided between the cup lip and the circular groove of the plate so as to completely seal the hot food aggregate within the container. The carry-out order may then be transported to the place where the food is to be consumed and the container may then be inverted and removed from the paper plate so that the contents of the container fall upon the paper plate. With this arrangement, no additional eating or serving plate is necessary since the paper plate serves as both the container lid and the serving or eating platter.

In addition to the above arrangement, after insertion of the food aggregate into the container, the paper plate may then be positioned upon the container with the circular groove of the plate frictionally engaging the cup container lip and the assembly may be inverted with the plate being in its normal usage position. Associated condiments for the carry-out order, such as, for example, garlic bread, olives, Parmesan cheese and the like, may be distributed upon the paper plate on the surface area surrounding the exterior of the container. The paper plate, together with the converted container, is then covered with an overwrap of plastic material, such as, for example, Saran, or may be covered by a preformed pressure formed biax styrene member. The overwrap acts to completely seal the associated condiments, such as, for example, the bread sticks, tossed salad, olives, pickles and so forth as well as acting as an additional seal for the container and paper plate lid combination.

The paper plate employed may be coated on its eating surface with a suitable plastic material so as to be more desirable for use with hot food aggregate. The paper plate may also be predecorated and/or provided with suitable advertising material to identify the carry-out establishment, which decorations and/or publicity are dependent only upon the needs of the user. If desired, the cup-like container may also be predecorated and/or provided with advertising material such that the material identifying the carry-out establishment is placed upon the outer surface of the cup container in inverted form so that during transport of the carry-out order the advertising material and/or restaurant name is presented in readable fashion to the carry-out purchaser.

As an additional feature, the papier-mâché plate may further be provided with a substantially circular overlay of aluminum foil sheeting which is positioned so that it covers the circular groove provided in the paper plate. This arrangement provides additional sealing and insulating characteristics for the carry-out transport operation.

The container assembly of the instant invention in the carry-out assembled form provides low surface area high volume density for the hot food aggregate placed within the container, in addition to which radiant losses from over 50% of the cup surface area are contained within the sealed overwrap of the overall assembly, thus keeping conductive losses through the top and bottom of the assembly at a minimum. The removal of the container holding the food aggregate provides the plate with a surface area twice the surface area of the container, making it ideal for eating or serving purposes. The instant arrangement provides a marked advantage over transport of food within a container alone due to the fact that it necessitates an additional plate to accompany the container or requires the provision of a plate at the eating place of the carry-out customer. The arrangement of the instant invention also has an advantage over preparation of a carry-out order on a plate with an overlay in that the overall radiating surface area of such a plate (without the container) is more than double the radiating surface area of the arrangement of the instant invention, thus exposing the hot food aggregate to an extremely large amount of cooling during the time in which the carry-out is being transported to the place where the food is to be consumed.

It is therefore one object of the instant invention to provide a novel carry-out container assembly which serves the dual functions of providing a low surface area high volume density container for transportation of the carry-out order and which also serves the function of supplying a serving or eating platter for the hot food aggregate at the place where the food is to be consumed.

Still another object of the instant invention is to provide a novel food carry-out container comprised of a cup-like container and a preformed paper plate which serves the dual functioning of acting as the lid for the container and as a serving or eating platter for the hot food aggregate.

Still another object of the instant invention is to provide a novel carry-out food container comprised of a first cup-like container and a plate-shaped lid for sealing the container which may further be employed to receive the associated condiments of the carry-out order which are completely sealed within a container overwrap and are further isolated from the hot food aggregate by the container sidewalls.

These, and other objects of the instant invention will become apparent when reading the accompanying description and drawings in which:

FIGURE 1A shows a top view of the container assembly of the instant invention assembled for the purpose of the carry-out function.

FIGURE 1B is a cross-sectional view of the assembly of FIGURE 1A taken along the lines A—A'.

FIGURE 2A shows a cross-sectional view of the container of FIGURES 1A and 1B.

FIGURE 2B shows a modified cross-sectional view to that of FIGURE 1A.

FIGURES 3A–3D show the developmental procedure for the preparation of a carry-out order employing the arrangement on the instant invention.

Referring now to the drawings and more specifically to FIGURES 1A, 1B, 2A and 2B, there is shown therein a container 11 and a preformed paper plate 12. The cup-like container 11 is substantially cylindrical in shape and is provided with a base portion 11A and tapered cylindrical sidewall 11B extending upward therefrom so as to form a marginal lip 11C at the open end thereof. Cup 11 may be formed of any suitable paper or plastic material which exhibits superior insulating characteristics.

The preformed plate 12 has a central portion 12A which is provided with a circular groove 12B having a diameter substantially equal to the diameter of the lip portion 11C of cup container 11. In the engaged position of FGURE 1B, it can be seen that the lip portion 11C frictionally engages the sides of circular groove 12B so as to provide an excellent seal therebetween.

The central portion 12A of plate 12 extends outwardly to form the sloping sides 12E, which slope gently upward and outward to form a substantially shallow plate for either serving or eating purposes.

With the container cup 11 and plate 12 in the assembled carry-out position, as shown in FIGURES 1A and 1B, the hot food aggregate 13 is sealed between the container bottom and sidewalls 11A and 11B respectively, as well as the central portion 12A of the plate 12. The remaining upper surface area 12E of plate 12 may be utilized for the placement of additional condiments accompanying the take-out order, such as, for example, bread 14, olives 15, a tossed salad 16 and other typical condiments which may accompany a hot food aggregate, such as spaghetti, ravioli and the like. The underside of the base portion 11A of container 11 may be employed for the purpose of receiving a packet 17 containing, for example, Parmesan cheese, oil dressing, and so forth.

The container assembly 10 is further provided with a plastic film overwrap 18, which acts to completely seal the cup 11 and the condiments 14–17 from the elements. The overwrap 18 may be any suitable plastic film, such as, for example, Saran wrap, or may alternatively be a preformed plastic cover which snaps over the plate 12 and is provided with a circular curved lip 18a for locking the preformed cover 18 to the plate 12.

The plate 12 may be formed of any suitable material, such as, for example, papier-mâché or plastic. In the alternative, if a papier-mâché material is employed, the eating surface of the plate 12 may be provided with a plastic coating to make the plate resistant to hot food aggregates and also to enhance the insulating properties of the container assembly. When formed of a plastic material, the plate may be formed of any desirable color or colors and may be predecorated to increase the aesthetic appeal of the plate. In addition thereto, when forming the plate of plastic or of plastic coated papier-mâché, the plate may be durable enough to permit its reuse. The plate, whether formed of plastic, papier-mâché or plastic-coated papier-mâché, may be stamped out in one single automatic operation which forms the circular groove 12B as well as forming the base portion 12A and the sloping sides 12E thereof.

Cup container 11 may be formed in any suitable fashion or presently available cups may be employed to form the containers assembly 10 of FIGURES 1A and 1B. The cup container 11 may also have a plastic coated interior or may be wholly formed of a plastic material to enhance the insulating properties of the overall assembly. Cup container 11 may also be predecorated to enhance its aesthetic appeal and may also contain advertising material or other suitable printing, such as, for example, the printing 19 shown in FIGURE 3A. It should be noted that the printing is inverted on the cup, as shown in FIGURE 3A, for presentation purposes, in a manner to be more fully described.

The preparation of the take-out container assembly (with reference to FIGURES 3A–3D) is as follows:

The cup container 11 is placed in the position, as shown in FIGURE 3A and the container is filled with the hot food aggregate. After filling the cup container 11 with the hot food aggregate, the plate 12 is then positioned upon the container 11 in the manner shown in FIGURE 3B so that the circular groove 12B frictionally engages the lip 11C of container 11. This provides an adequate seal for the hot food aggregate contained within the assembly comprised of container 11 and plate 12. The assembly of FIGURE 3B is then inverted in the manner shown in FIGURE 3C. As can clearly be seen, the reason for inverting the advertising matter on the cup 11 is due to the fact that in the carry-out operation the cup is inverted in the manner shown in FIGURE 3C and the printing 19 is now in the upright position making it easily readable.

The associated condiments, which as, for example, the bread 14, may now be positioned upon the plate 12, in the manner shown in FIGURE 3C. In order to completely seal the assembly of FIGURE 3C a plastic overwrap, or preformed cover is then positioned upon the plate 12 to provide a container assembly which is easily transportable and which may be utilized as the serving or eating platter simply by removal of the overwrap or preformed cover 18 and the cup container 11. Removal of the cup container 11 causes the food aggregate contained therein to fall upon the plate 12 placing the carry-out order in readiness for being consumed by the carry-out purchaser.

As an alternative embodiment in cases where no additional condiments accompany the food order, the carry-out order may be transported by holding the order in either the position of FIGURE 3B or the position of FIGURE 3C to the place where the food is to be consumed.

To further enhance the sealing and insulating properties of the assembly a substantially flat circular sheet of aluminum foil or a plastic sheet 21 (see FIGURE 2B) may be provided which covers the central portion 12A of plate 12 such that the aluminum foil or plastic sheet member 21 is forced into the circular groove 12B in the manner shown in FIGURE 2B either during the stamping operation of the plate 12 or upon insertion of the cup lip 11C into the circular groove 12B.

The carry-out container assembly of the instant invention provides a carry-out assembly which has a substantially small radiating surface area and a high volume density for the food aggregate 13 during the carry-out operation such that the surface areas where the heat may be conducted away, which are the base portion 11A and the base portion 12A of the cup 11 and plate 12, respectively, are substantially small and the remaining surface area, namely, the sidewall 11B of cup 11, radiates heat into the area 22 enclosed by the plastic overwrap 18 so as to hold the heat lost by radiation to a minimum [see FIGURE 3D].

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Food carrying and serving means for sealing a cylindrical container formed of an insulating material and being of the type employed for transporting heated foodstuffs and the like wherein said container is provided with a lip at the open end having a circular periphery; said means comprising a sheet of relatively stiff insulating material; the central portion of said sheet having a circular groove; the diameter of said groove being substantially equal to the diameter of said lip; said sheet having an outer pheriphery substantially greater than said circular groove; the outer dimensions of said sheet being sufficient to accommodate foodstuffs normally served at the dinner table; the outer band of said sheet being bent upward at a small angle to form a serving platter; said groove frictionally engaging the lip of said container seated therein to completely seal the contents thereof for transportation purposes; said platter being circular in shape the outer diameter of said platter being in the range of 8 to 11 inches.

2. Food carrying and serving means for sealing a cylindrical container of the type employed for transporting heated foodstuffs and the like wherein said container is provided with a lip at the open end having a circular periphery; said means comprising a sheet of relatively stiff insulating material; the central portion of said sheet having a circular groove; the diameter of said groove being substantially equal to the diameter of said lip; said sheet having an outer periphery substantially greater than said circular groove; the outer dimensions of said sheet being sufficient to accommodate foodstuffs normally served at the dinner table; the outer band of said sheet being bent upward at a small angle to form a serving platter; said groove frictionally engaging the lip of said container seated therein to completely seal the contents thereof for transportation purposes; said container being inverted when sealed by said platter; the region being between said circular groove and the outer periphery being adapted to receive foodstuffs.

3. Food carrying and serving means for sealing a cylindrical container of the type employed for transporting heated foodstuffs and the like wherein said container is provided with a lip at the open end having a circular periphery; said means comprising a sheet of relatively stiff insulating material; the central portion of said sheet having a circular groove; the diameter of said groove being substantially equal to the diameter of said lip; said sheet having an outer periphery substantially greater than said circular groove; the outer dimensions of said sheet being sufficient to accommodate foodstuffs normally served at the dinner table; the outer band of said sheet being bent upward at a small angle to form a serving platter; said groove frictionally engaging the lip of said container seated therein to completely seal the contents thereof for transportation purposes; said container being inverted when sealed by said platter; the region being between said circular groove and the outer periphery being adapted to receive foodstuffs; cover means for enclosing the inverted container and the upper surface of said platter to protect the foodstuffs on said platter and insulating the heated foodstuffs in said inverted container.

4. Food carrying and serving means for sealing a cylindrical container of the type employed for transporting heated foodstuffs and the like wherein said container is provided with a lip at the open end having a circular periphery; said means comprising a sheet of relatively stiff insulating material; the central portion of said sheet having a circular groove; the diameter of said groove being substantially equal to the dimeter of said lip; said sheet having an outer periphery substantially greater than said circular groove; the outer dimensions of said sheet being sufficient to accommodate foodstuffs normally served at the dinner table; the outer band of said sheet being bent upward at a small angle to form a serving platter; said groove frictionally engaging the lip of said container seated therein to completely seal the contents thereof for transportation purposes; said platter being papier-mâché.

5. Food carrying and serving means for sealing a cylindrical container of the type employed for transporting heated foodstuffs and the like wherein said container is provided with a lip at the open end having a circular periphery; said means comprising a sheet of relatively stiff insulating material; the central portion of said sheet having a circular groove; the diameter of said groove being substantially equal to the diameter of said lip; said sheet having an outer periphery substantially greater than said circular groove; the outer dimensions of said sheet being sufficient to accommodate foodstuffs normally served at the dinner table; the outer band of said sheet being bent upward at a small angle to form a serving platter; said groove frictionally engaging the lip of said container seated therein to completely seal the contents thereof for transportation purposes; said platter being formed from a plastic sheet.

References Cited by the Examiner
UNITED STATES PATENTS

| 1,446,782 | 2/23 | Broun, et al. | 206—46 |
| 1,463,360 | 7/23 | Foote | 220—23.86 |
| 2,357,258 | 8/44 | Harris | 206—46 |
| 2,960,218 | 11/60 | Cheeley | 206—46 |
| 3,095,132 | 6/63 | Hawley | 229—1.5 |

FRANKLIN T. GARRETT, *Primary Examiner.*